United States Patent Office 3,365,885
Patented Jan. 30, 1968

3,365,885
AUTOMATIC FLUID FLOW CONTROL SYSTEMS
Donald Firth and Roger Harvey Yorke Hancock, East Kilbride, Glasgow, Scotland, assignors to Council for Scientific and Industrial Research, London, England, a body corporate of the United Kingdom
Filed July 9, 1964, Ser. No. 381,495
Claims priority, application Great Britain, July 19, 1963, 28,694/63
14 Claims. (Cl. 60—53)

This invention relates to automatic fluid flow control systems, and is particularly, although not exclusively, applicable to hydraulic systems such as that disclosed in the specification and drawings of patent application No. 262,072, now Pat. No. 3,175,354.

In a hydrostatic power transmission system such as that disclosed in the specification and drawings of patent application No. 262,072 the temperature of the working fluid—hereinafter referred to for convenience as oil—can rise to dangerous levels at which chemical or physical changes can occur to the detriment of its hydraulic characteristics. In order to counteract this, a heat exchanger can be included in the main power transmission circuit of the oil, but such a heat exchanger must then be designed to carry the full oil flow at the full working pressure, and becomes both bulky and heavy.

It is an object of the present invention to provide a system whereby the temperature of the working fluid in a pressure fluid circuit may be controlled without the necessity for a high pressure full flow heat exchanger.

Another object is to provide an automatic control valve for governing the throughput of the heat exchanger in accordance with the conditions in the working fluid circuit.

According to the present invention, in an automatic fluid flow control valve, coacting valve components such as a sleeve and a piston are axially reciprocable relatively to each other in response to changes in temperature of the fluid, one component (which may be the sleeve) having at least one port subject to variable obturation by the other component (which may be the piston) and a bleed port which is permanently open, both ports being adapted to pass fluid from the inlet to the outlet to the valve, and at least one of the coacting valve components being axially movable under the control of a thermometer responsive to changes in temperature of the fluid flowing through the valve.

Preferably, both components are movable relative to a valve body, and one of the components is movable to a position in which the port or ports is or are beyond the control of the other component.

Advantageously, the said other component is axially movable in response to fluid pressure difference across the valve.

In an automatic fluid flow control system according to the invention for a fluid flow circuit having reversible high and low pressure working fluid lines, a valve as set out above has its inlet connected through a differential pressure change-over valve to the working fluid line which is at the lower pressure and its outlet connected to a heat exchanger for cooling the working fluid.

Practical embodiments of the present invention will now be described, by way of example only, with reference to the accompanying drawings in which.

Figure 1:
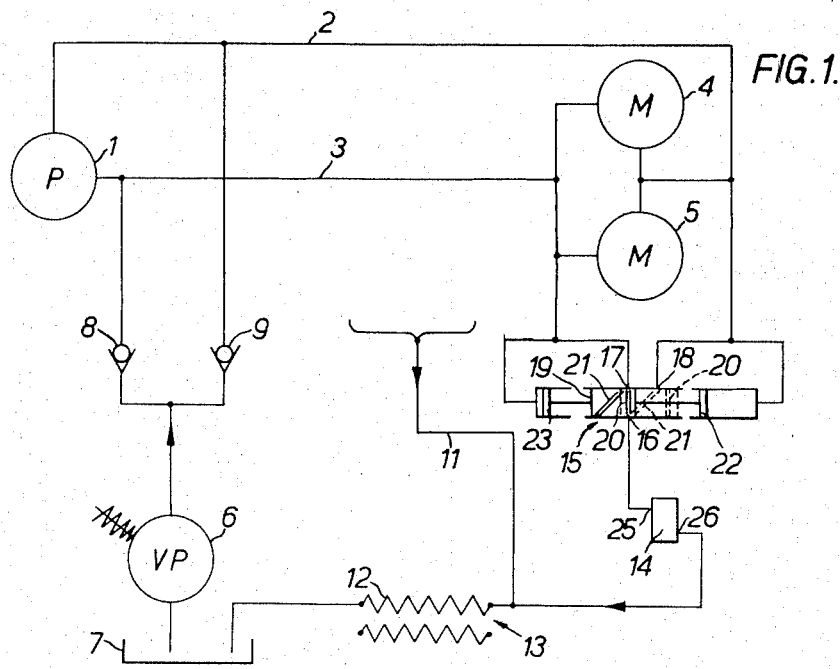
FIGURE 1 is a simplified circuit diagram of a hydrostatic transmission system such as that disclosed in the specification and drawings of patent application No. 262,072 as modified in accordance with the present invention.

Referring first to FIGURE 1, a hydrostatic power transmission system comprises a main high pressure reversible hydraulic pump 1 such as a swash plate pump according to United States Patent No. 3,089,427 which pumps oil at working pressure round a circuit consisting of flow and return lines 2, 3 and a pair of rotary motors 4, 5 acting in parallel. Either line 2 or 3 may be at a higher pressure than the other depending on the direction of rotation of the pump 1 and the angle of its swash plate. A precharge pump 6 is driven from the same source (not shown) of mechanical input power as that driving the pump 1, and serves to maintain the power transmission system 1 . . . 5 full of oil despite leakage, and at a minimum pressure determined by the operating conditions of the system—for example, sufficient to maintain contact between the slippers and the swash plate of a swash plate pump. The pre-charge pump is of the variable displacement vane type and has a falling pressure/flow characteristic—i.e. maximum delivery pressure occurs at zero output.

The pre-charge pump 6 feeds oil collected in a sump or reservoir 7 back into the line 2 or 3—whichever is at the lower pressure—through respective non-return valves 8, 9 the supply to the sump or reservoir 7 being partly derived from a leakage oil circuit connecting the casings of the main pump 1 and motors 4, 5 to a common leakage collector line 11. The leakage line 11 feeds oil into the sump 7 through the working fluid element 12 of a heat exchanger whose other element 13 is supplied with cooling fluid from any convenient source (not shown). The cooling fluid element 13 of the heat exchanger may for example, be connected in the cooling fluid circuit of the prime mover (not shown) driving the main and pre-charge pumps 1, 6. In this way, leakage oil is cooled before being returned to the system.

However, the cooling effect of the returned leakage oil may be insufficient to prevent an undesirable rise in the temperature of the oil in the working circuit 1 . . . 5. The present invention seeks to avoid this in the arrangement shown in FIGURE 1, by providing a low pressure by-pass circuit including an automatic flow control valve 14 and a pressure-sensitive change-over valve 15 which serves to connect the inlet side of the valve 14 to whichever of the lines 2, 3 is at the lower pressure. This change-over valve has a common outlet port 16 connected to the valve 14 and two inlet ports 17, 18 connected respectively to the lines 2, 3. A spool 19 has a pair of through passages 20, 21 either of which can register at one end with the common outlet port 16 while their other ends can be brought into register with the respective inlet ports 17, 18. Only one inlet port can be placed in communication with the outlet port at any one time, the appropriate connection being determined by the differential action of two pistons 22, 23 whose respective cylinders are open to the corresponding line 2 or 3. The spool 19 will thus be moved by the differential pressure across the motors 4, 5 to connect the lower pressure line 2 or 3 to the automatic flow control valve 14.

In the event that the pressure in the lines 2, 3 are substantially equal, which may occur, for example, when the motors 4, 5 are on very light load, the response of the spool 19 may be sluggish, and the main pump 1 may then deliver oil direct into the precharge reservoir 7 through the heat exchanger 13. In order to guard against this, the spool 19 is preferably spring-loaded to a central cut-off position in which no oil can pass to the outlet port 16. The spring (not shown) will be set to a predetermined loading corresponding to a minimum pressure difference between the lines 2, 3 of, say, 200 lb./in.$^2$.

The automatic valve 14 operates in the circuit of FIGURE 1 to extract oil from the working circuit 2, 3 at a rate which is primarily a function of the temperature of the oil and return it to the working circuit through the cooler 13 and the precharge pump 6, the volume rate of flow of this oil being such that the temperature of the oil in the working circuit is kept below a predetermined maximum.

Figure 2:
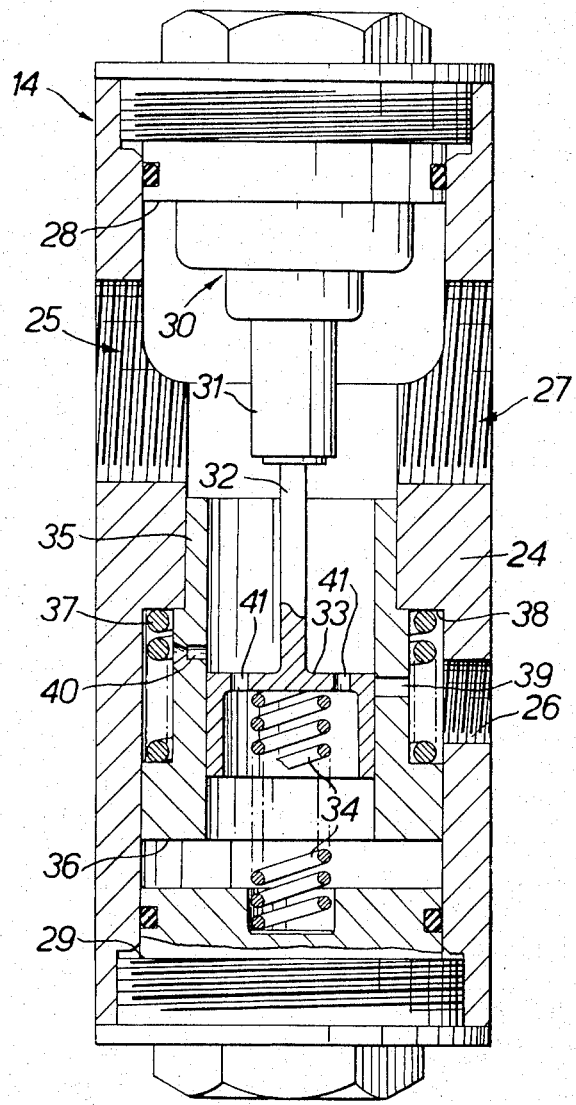
FIGURE 2 is a sectional view of the automatic flow control valve used in the circuit of FIGURE 1.

The construction of the automatic valve 14 is shown in FIGURE 2. The valve consists of a generally cylindrical body 24 having inlet and controlled outlet ports 25, 26 respectively. An uncontrolled outlet port 27 may also be used in circuits such as that shown in FIGURE 4 (to be described below). The top and bottom ends of the casing 24 are closed by plugs 28, 29 respectively, these plugs being sealed in fluid-tight manner against leakage. The upper plug 28 carries a temperature-responsive element 30 which is exposed to the oil in the inlet port 25 and presents an axially movable abutment 31 for the rod 32 of a piston 33 which is spring-loaded by a compression spring 34 and slides in a sleeve 35.

The sleeve 35 is a sliding fit within the cylindrical casing 24, the bore of which is stepped to accommodate an enlarged head 36 at the lower end of the sleeve, and a helical compression spring 37 surrounding the sleeve 35 above the head. At its upper end the spring 37 bears against the step or shoulder 38 in the bore of the casing. The sleeve 35 is pierced radially by a control port 39 (there will normally be several such control ports at different levels to provide a progressive flow control action over a practical range of relative displacements between the piston 33 and the sleeve 35) which is in constant communication with the controlled outlet port 26 and, when not covered by the piston 33, with the inlet port 25. A bleed port 40 is permanently in open communication with both the inlet and outlet ports 25, 26, whilst the underside of the sleeve head 36 is permanently exposed to inlet port pressure through ports 41 in the crown of the piston 33.

In operation, the spring 34 maintains the piston 33 in contact with the temperature responsive abutment 31 so that the piston moves up and down with changes in oil temperature in the working circuit 1 ... 5. The bleed port 40 provides a sufficient (though small) flow of oil through the valve when nominally shut to ensure that these oil temperature changes reach the thermal element 30. As the oil temperature rises, the abutment 31 moves down and thus forces the piston 33 down to uncover a greater area of control port or ports 39 and thereby by-pass more oil through the cooler 13 and pre-charge pump 6. The working circuit thus receives a greater quantity of cold oil, and equilibrium conditions are restored. If the oil temperature falls, the reverse action takes place. Also, as pressure falls in the low pressure line of the working circuit 1 ... 5 the output of the precharge pump 6 rises, and this output is cool.

If leakage from the system becomes excessive, the pressure in the inlet port 25 will fall and the spring 37 will force the sleeve 35 downwards against the weakened thrust acting on the head 36 of the sleeve. This has the effect of closing the control ports 39, since the piston 33 is not affected by pressure changes. Thus, the valve 14 helps to ensure that the pressure in the return line 2 or 3 does not fall dangerously low, as might happen if the rate of leakage plus the by-pass flow through the valve were to exceed the pump capacity. In a practical case, the spring 37 is rated to commence moving the sleeve 35 downwards at about 110 lb./in.², and moves it beyond the limit of further control by the piston 33 at about 95 lb./in.². At and below this pressure, the valve 14 remains shut irrespective of temperature variations in the oil.

Figure 3:
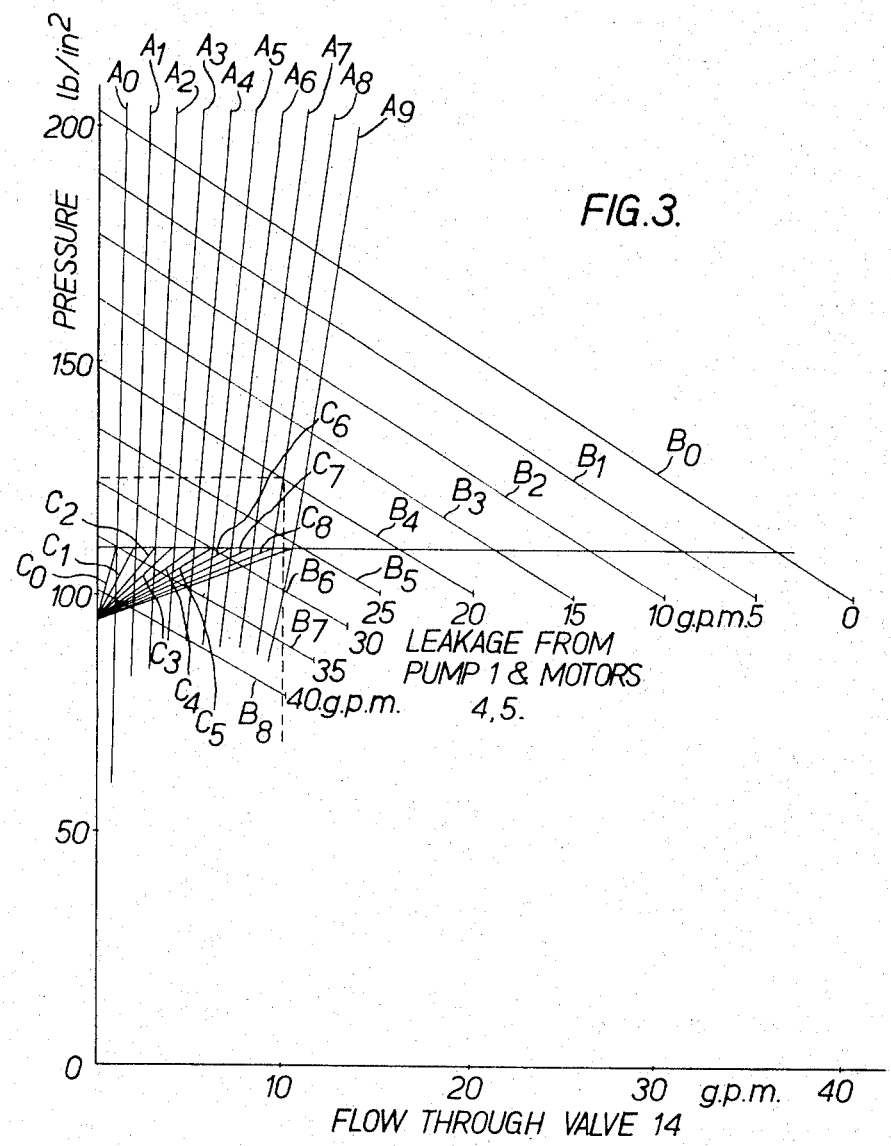
FIGURE 3 is a series of pressure/flow curves.

Referring now to FIGURE 3 of the drawings the family of curves marked A represent the pressure/flow characteristics of the control ports 39 of the valve over the normal working range. The curves are substantially straight lines, and represent the performance of an automatic flow control valve 14 having 9 control ports 39 in its sleeve 35. The curves are referenced $A_0$–$A_9$ the curve $A_0$ showing the characteristic for all control ports closed and only the bleed port 40 passing oil. The curves B show the precharge pump delivery minus the leakage flow in the system, curve $B_0$ representing zero leakage and hence being the pump characteristic. The other curves are drawn at arbitrary intervals of 5 gallons/minute leakage. The family of curves $C_0$–$C_9$ represent the modifications of the curves $A_0$–$A_9$ imposed by the spring actuation of the sleeve 35.

Let it be assumed that in a given transmission system the leakage flow is 20 gallons per minute; the precharge pump 6 is driven at constant speed (say 1700 r.p.m.); and the oil temperature is sufficiently high to cause the piston 33 in the valve 14 to be moved to open eight control ports 39. The relevant curves in FIGURE 3 appertaining to these conditions are the curves $A_8$ and $B_4$. The precharge circuit will therefore settle automatically at the condtions represented by the point of intersection of these two curves. From FIGURE 3, it will be seen that this intersection occurs at the point whose pressure co-ordinate is 125 lbs. per square inch and whose valve flow co-ordinate is 10 gallons per minute. This means that at the constant speed of 1700 r.p.m., the pump is maintaining a precharge pressure in the line 2 or 3 of 125 lbs. per square inch and is delivering 30 gallons per minute, of which ten gallons per minute is passing through the valve 14.

If the oil temperature now falls, the piston 35 in the valve 14 rises and closes successive control ports 39. If this continues to the point where the temperature of the oil stabilises the valve at the setting where only two control ports 39 are open, the valve characteristic relevant to these conditions is $A_2$. If the rate of leakage remains constant at 20 gallons per minute, the precharge pump circuit stabilises at the intersection represented by the conditions of the curves $A_2$ and $B_4$. These conditions are a precharge pressure of 140 lbs. per square inch and a flow rate through the valve of 2.8 gallons per minute. The total flow through the oil cooler 13 is thus reduced from 30 gallons per minute to 22.8 gallons per minute.

Reverting to the original postulated conditions, if the temperture of the oil remains constant and the leakage increases, the valve characteristic is $A_8$ but the pump characteristic changes. Thus, for a leakage of 25 gallons per minute, the precharge pressure and valve flow are given by the intersection of the curves $A_8$ and $B_5$, the values being 114 lbs. per square inch and 9.5 gallons per minute. If, however, the leakage increases to 30 gallons per minute, the pump curve is $B_6$. Since, however, this curve intersects the valve curve $A_8$ below a pressure of 110 lbs. per square inch—which is the pressure at which the spring 37 begins to move the sleeve 35 downwards relative to the piston 33—the operative valve characteristic is the curve $C_8$, and the precharge circuit conditions are represented by the intersection of this curve by the curve $B_6$. In other words, the operating conditions are a precharge pressure of about 112 lbs. per square inch and 7.5 gallons per minute through the valve 14. If leakage increases still further, the pump characteristic is displaced further to the left in FIGURE 3 through the position $B_8$ representing a leakage of 40 gallons per minute until the characteristics ceases to intersect any of the curves C. Under these conditions, and irrespective of the temperature of the oil, the valve 14 is closed except for the normal bleed, and the whole of the output of the precharge pump 6 makes up the losses due to leakage oil flowing through the leakage line 11.

Figure 4:
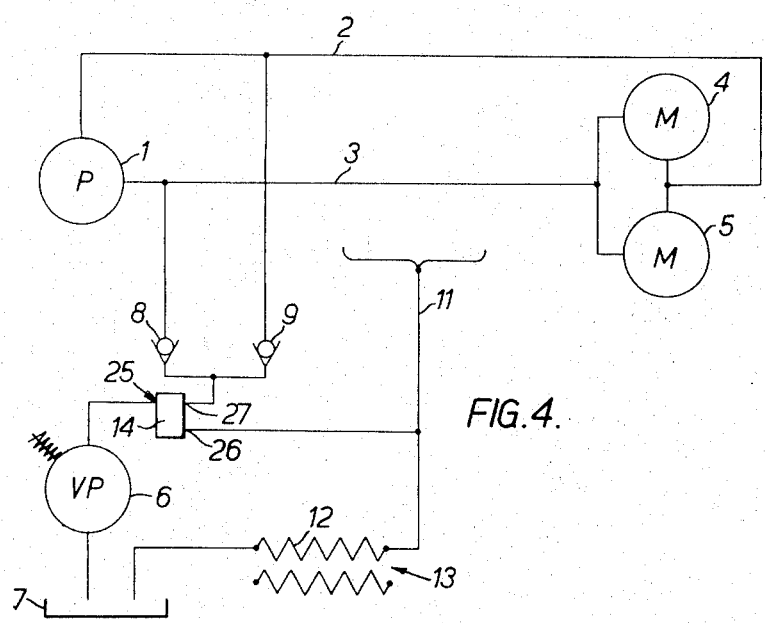
FIGURE 4 is a modified arrangement of FIGURE 1.

FIGURE 4 shows a modified circuit in which the automatic flow control valve 14 is connected on the discharge side of the precharge pump 6, the uncontrolled outlet 27 being connected to the system through the non-return valves 8,9 and the controlled outlet 26 to the oil inlet to the heat exchanger 13. The latter thus provides a by-pass across the pump 6, and the valve 14 determines the amount of flow through this by-pass in accordance with the temperature of the precharge oil.

It will be understood that the number of control ports 39 will be selected according to the required operating characteristic of the valve. A single port may be substituted if preferred, and this may be profiled to give a graduated flow of desired characteristic.

We claim:

1. A pressure fluid power transmission system having a main pump, a motor, and a main circuit comprising main flow and return lines between said pump and said motor for the circulation of working fluid therebetween; an auxiliary low pressure by-pass circuit connected to said main circuit to divert a proportion of the return flow fluid through a heat exchanger to a reservoir; a precharge pump for feeding working fluid from said reservoir to said main circuit; and valve means operable in response to the pressure and temperature of the working fluid for controlling the proportion of low pressure fluid diverted to said heat exchanger and reservoir, said valve opening with rise in temperature and with rise in pressure above a predetermined safe minimum value.

2. A pressure fluid power transmission system according to claim 1 wherein the valve means includes a pressure balance valve connected across said main flow and return lines for sensing the pressure differential in the working fluid therein and for connecting said by-pass circuit to the line which is, for the time being, at lower pressure, and a flow control valve having a thermometer element responsive to the temperature of the by-passed working fluid and a pressure responsive element exposed to the pressure of said by-passed working fluid, and a common outlet port controlled by both said elements.

3. A system as claimed in claim 1 wherein the precharge pump has a falling pressure/flow characteristic.

4. A system as claimed in claim 1 wherein the inlet to the valve means is connected to the outlet of an automatic pressure-responsive change-over valve for selectively supplying working fluid from whichever line diverting fluid to said auxiliary circuit from whichever line of the main circuit is at the lower pressure.

5. A system as claimed in claim 1 wherein the inlet to the valve means is connected to the outlet from the precharge pump.

6. A system as claimed in claim 1 wherein the inlet to the heat exchanger is also connected to leakage fluid ports for receiving leakage fluid from both the main pump and the motor.

7. A system as claimed in claim 1 wherein the precharge pump is connected to both said lines of the main circuit through connecting lines, each connecting line including a non-return valve permitting the flow of fluid only from the precharge pump to the said main circuit.

8. A system as claimed in claim 1 wherein the valve means has a hollow body provided with inlet and outlet ports for the passage of fluid through the valve means, and coacting sleeve and piston valve components which are relatively displaceable under the control of a thermometer element located in the fluid circuit through the valve means so as to be exposed to the fluid, the sleeve element having at least one control port which can be variably obturated by the piston and a bleed port which is not obturated by the piston and is in permanent communication with both the inlet and outlet ports of the valve to maintain a continuous small flow of fluid past the control element.

9. A system as claimed in claim 8 wherein the valve means has at least one control port located beyond the range of complete obturation by the piston when the inlet fluid pressure exceeds a given value.

10. An automatic fluid flow control valve comprising a valve body; inlet and outlet ports in said body for connection to a fluid circuit, a thermometer element displaceable linearly in response to changes in temperature and located in the fluid circuit through the valve; a sleeve valve component interposed between the inlet and the outlet ports and having a permanently open bleed port for maintaining a continuous small flow of fluid through the valve and at least one control port for variable obturation in accordance with fluid pressure and temperature; a piston valve element slidably disposed within said sleeve and connected to said thermometer element for movement therewith to obturate said control ports upon a reduction of temperature of the fluid; and said sleeve being linearly displaceable, and including means for moving the sleeve to obturate the control port in response to a reduction of pressure of the fluid below a predetermined level.

11. An automatic fluid flow control valve as claimed in claim 10 including a head formation on the end of said sleeve remote from the inlet port, and a spring member located between and acting between said head and said body for urging the sleeve away from the inlet port to obturate the control port.

12. An automatic fluid flow control valve as claimed in claim 11 including a second spring located and acting between said piston and said body for urging said piston into contact with said thermometer element in a linear direction opposite to that of said first mentioned spring member.

13. An auomatic flow valve according to claim 12 wherein a port is formed in said piston for admitting fluid at the inlet pressure to the working face of the said piston head.

14. An automatic flow control valve comprising a valve body having inlet and outlet ports, a pair of coacting valve members including a piston and a sleeve located within said body and displaceable relatively to one another under the control of a temperature responsive element located in the fluid circuit through the valve so as to be exposed to the fluid flowing through said valve, said valve members coacting to variably obturate at least one control port by said relative displacement, and a bleed port which is not obturated and is in permanent communication with both the inlet and outlet ports of the valve so as to maintain a comparatively small flow of fluid past the temperature responsive element, one valve member being displaceable by the temperature responsive element in one direction against the action of a spring and the other valve member being displaceable by the fluid pressure within the valve body in the opposite direction against the action of a spring, whereby the quantity of fluid flowing through the valve is dependent upon both the temperature and the pressure of the fluid.

References Cited

UNITED STATES PATENTS

| 853,693 | 5/1907 | Healey | 137—625.3 XR |
|---|---|---|---|
| 2,166,940 | 7/1939 | Conradson | 60—52 |
| 2,211,646 | 8/1940 | Cole | 137—625.3 |
| 2,459,148 | 1/1940 | Christensen | 137—602 XR |
| 2,661,243 | 12/1953 | Fox | 236—92 XR |
| 2,698,717 | 1/1955 | Sisco | 236—92 XR |
| 2,810,527 | 10/1957 | Work | 236—92 XR |
| 2,837,285 | 6/1958 | Utban | 236—92 XR |
| 2,980,132 | 4/1961 | Prijatel et al. | 437—625.3 XR |
| 3,047,055 | 7/1962 | Kymm | 236—92 XR |
| 3,112,764 | 12/1963 | Anderson et al. | 137—625.3 XR |
| 3,219,059 | 11/1965 | Williams et al. | 137—625.3 |

FOREIGN PATENTS 990,432  4/1965  Great Britain.

M. CARY NELSON, *Primary Examiner.*

S. SCOTT, *Assistant Examiner.*

UNITED STATES PATENT OFFICE
CERTIFICATE OF CORRECTION

Patent No. 3,365,885                                  January 30, 1968

Donald Firth et al.

It is hereby certified that error appears in the above numbered patent requiring correction and that the said Letters Patent should read as corrected below.

In the heading to the printed specification, lines 4 to 6, for "assignors to Council for Scientific and Industrial Research, London, England, a body corporate of the United Kingdom" read -- assignors, by mesne assignments, Minister of Technology, a corporation --.

Signed and sealed this 8th day of April 1969.

(SEAL)
Attest:

Edward M. Fletcher, Jr.                          EDWARD J. BRENNER

Attesting Officer                                      Commissioner of Patents